Patented Apr. 27, 1948

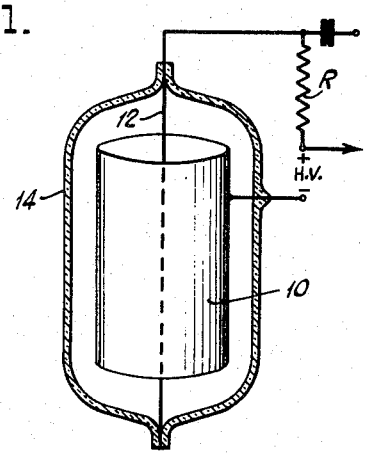
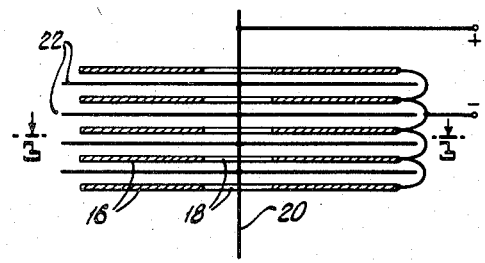
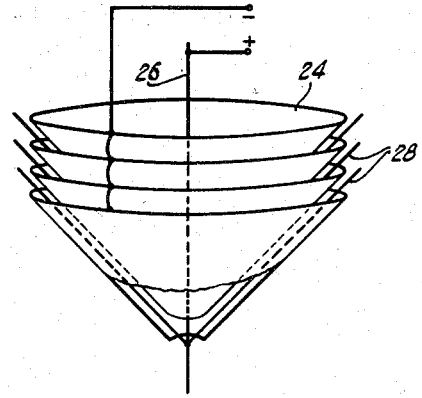
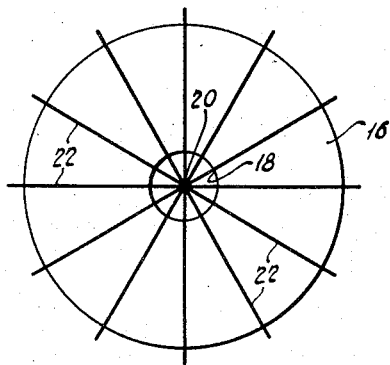
INVENTOR.
DONALD G. C. HARE.
BY
ATTORNEY.

2,440,511

UNITED STATES PATENT OFFICE 2,440,511

RADIATION DETECTOR

Donald G. C. Hare, Roslyn, N. Y., assignor to Texaco Development Corporation, New York, N. Y., a corporation of Delaware Application December 29, 1944, Serial No. 570,264

7 Claims. (Cl. 250—83.6)

This invention relates to a device for detecting penetrative radiation and more particularly to a device of the counter type for detecting and measuring the intensity of such radiation as gamma rays.

The principal object of the invention is to provide a device of this type which will have an efficiency much higher than the conventional Geiger-Mueller counter and which will be well adapted for the detecting of gamma rays emitted from subterranean formations as in connection with the logging of wells and bore holes.

In the copending patent application of myself and another filed November 2, 1940, Serial No. 364,020, now Patent Number 2,397,073 issued March 19, 1946, and in my copending application filed October 16, 1941, Serial No. 415,194, now Patent Number 2,397,074 issued March 19, 1946, there are disclosed devices for the detecting of penetrative radiation, which devices have efficiencies many times that of the device known to the prior art. In accordance with the inventions disclosed in the above mentioned applications, a number of thin metal plates are arranged in parallel, slightly separated relation and are connected together electrically to form a cathode, and a number of fine wires are disposed parallel to and between adjacent plates, these wires being connected together to form the anode of the device. The present invention relates to a detector of this general type having the features of high efficiency and stable operation as well as other advantages not necessarily inherent in the devices disclosed in the aforementioned applications.

In accordance with the invention a radiation detecting device is formed preferably of a plurality of thin, electrically conducting, cathode plates or sheets, these plates being of similar conformation and spaced uniformly apart so that spaces will be provided between adjacent plates. In one embodiment the plates are formed as discs and each plate is provided with a center hole so that when the plates are assembled in a bank the holes will be in alignment and will be concentric with the center axis of the bank. In another embodiment the plates are formed in the shape of truncated cones which are nested together in parallel, separated relation with the holes in the apex end of the cones in alignment. In both of these embodiments an anchor member such as a wire or small diameter rod is disposed on the center axis of the bank of plates, this anchor member forming a support for the ends of a plurality of fine wires which extend outwardly parallel to and between adjacent pairs of cathode plates. With these arrangements of the anodes the desired concentration or inhomogeneity of the electrical field is attained.

For a better understanding of the invention reference may be had to the accompanying drawing in which Fig. 1 is a diagrammatic view of a radiation detector of the conventional Geiger-Mueller counter, Fig. 2 is a somewhat diagrammatic sectional elevation through the cathode and anode of a detector embodying the invention, Fig. 3 is a horizontal section taken on the line 3—3 of Fig. 2, and Fig. 4 is an isometric view with portions broken away showing another embodiment of the invention.

The conventional Geiger-Mueller counter shown in Figure 1 consists of a thin-walled metal tube 10 with a very thin wire, comprising the anode 12, spanned axially and insulated from the metal tube forming the cathode. These electrodes are enclosed in an envelope 14, commonly a glass tube, which contains a suitable gas, e. g. argon, at a fairly low pressure, say 5–10 cm. of mercury. The central wire 12 is maintained at a positive potential with respect to the cylinder, and a fairly high resistance R is placed in the circuit. Normally the potential difference between the cathode 10 and wire 12 is nearly but not quite high enough to cause a discharge to take place. If a gamma ray capable of ionizing the gas passes through the cylinder 10, a discharge will take place with a current flow of the order of a few microamperes. This causes a large voltage drop across R and the discharge will cease after a very short period of time. By suitably amplifying the sudden voltage drop across R, a mechanical recorder or other device capable of registering the discharges of the counter may be actuated. Suitable treatment of the surface of the cylinder 10 and proper choice of the gas or gases filling the counter wil cause the discharge to stop more quickly and reliably. After the discharge has ceased, the counter is again in a condition to register the passage of an ionizing particle.

The probability of a gamma ray causing ionization of the gas in the conventional Geiger-Mueller counter is very small and practically all of the counts which are due to the passage of gamma rays are due to the electrons ejected from the cathode walls by the interaction of the gamma ray with the atoms of the cathode material. Since the range in the cathode material of an electron receiving energy of the gamma ray is seldom greater than one or two-tenths of a millimeter, nothing is to be gained by making the cathode wall thicker than about twice the average range of the electrons. Thus, it is preferable in a radiation detector for detecting gamma rays that the cathode wall be thin so that an electron can be ejected from the wall into the gas to be ionized. It is desirable that a large cathode surface be provided and therefore in carrying out the invention a plurality of thin plates are disposed in a bank to form the cathode.

With reference to Figures 2 and 3 of the drawing a plurality of thin metallic discs 16 each having a centrally disposed hole 18 are arranged in a bank in parallel, spaced relation so that the holes 18 will be aligned. Disposed along the center axis of the cathode bank is an anchor member 20 which may be in the form of a stiff wire or a rod of small diameter. Attached to the anchor member are the inner ends of a plurality of fine wires 22, these wires being arranged in several groups, the wires of each group extending radially outwardly between and parallel to the adjacent pair of cathode plates 16. It has been found that brass sheet having a thickness of about 16 mils is a suitable material for the cathode plates and that tungsten wires about 3 mils in thickness are suitable for the anode. By separating the cathode plates about two millimeters it will be seen that a comparatively large cathode surface is presented while the individual plates are sufficiently thin to permit the ejection of the electrons caused by the interaction between the gamma rays and the atoms of the plate material. As shown in Figure 2 the cathode plates are connected together electrically and the anchor member 20 may serve as the means for connecting the source of high voltage to the anode wires. Since the means for mounting or supporting the cathode plates and the anode wires does not form an essential part of this invention, no such means have been shown. It is understood that any suitable construction may be used for supporting these members, such as is shown, for instance, in my aforementioned pending application Serial No. 415,194. It is also understood that the device will be disposed within a suitable housing or container which may be of glass or metal. Such a container is also disclosed in Serial No. 415,194. The container will be filled with a suitable gas and it has been found that a mixture of about 97% argon and 3% petroleum ether at a pressure of about 20 inches of mercury is satisfactory as the ionizable medium.

In Figure 4 a modification is illustrated in which the cathode plates or sheets are formed as truncated cones 24 and are nested together or intermeshed so that the surfaces will be parallel while providing spaces therebetween. The holes or cut-off portions of the cones are disposed in alignment, and mounted on the longitudinal axis through these holes is an anchor member 26 similar to the member 20 of Figures 2 and 3. Attached to the anchor member 26 are a plurality of fine anode wires 28 shown as extending upwardly and outwardly parallel to and arranged equidistant from the adjacent cathode cones 24. As shown the high voltage is impressed across the cones and the anode wires. It is understood that the cathode members 24 and the anode wires 28 will be mounted in the relation shown in Figure 4 within a suitable housing, not shown, which housing will, of course, contain the gas to be ionized.

Obviously many modifications and variations of the invention, as hereinbefore set forth, may be made without departing from the spirit and scope thereof, and therefore only such limitations should be imposed as are indicated in the appended claims.

I claim:

1. A radiation detecting device comprising a plurality of thin metallic sheet members of similar conformation and spaced uniformly apart to form a cathode, said members being disposed in an ionizable medium, each of said members being provided with a hole and the holes being disposed in alignment, an anchor member disposed through said holes, and a plurality of anode wires attached at one end to said anchor member and extending outwardly through the spaces between said cathode members.

2. A device for detecting gamma rays comprising a housing, a plurality of thin, metallic discs in said housing arranged in parallel, separated relation to form a cathode bank, each of said discs being provided with a hole and said holes being disposed in alignment through said bank, an anchor element disposed along the axis of said holes, a plurality of anode wires attached to said anchor member and extending radially outward parallel to and between adjacent pairs of cathode discs and an ionizable medium in said housing.

3. A radiation detecting device comprising at least one pair of thin metallic sheet cathode members provided with aligned center holes, said members being disposed in an ionizable medium in parallel relation and separated to form a space therebetween, an anchor member mounted in said holes on the transverse axis of said sheets, and a plurality of wire-like anode elements connected to said anchor member and extending radially outward between and parallel to said cathode sheet members.

4. A device for detecting gamma rays comprising a housing, a plurality of thin, metallic discs of similar conformation arranged in parallel, separated relation to form a cathode bank in said housing each of said discs being provided with a hole and said holes being disposed in alignment through said bank, an anchor element coinciding with the axis of said holes, a plurality of anode wires attached to said anchor member and extending radially outward parallel to and between adjacent pairs of cathode discs, and an ionizable medium in said housing.

5. A device for detecting gamma rays comprising at least one pair of metallic, frusto-conical plate members, disposed in an ionizable medium in an intermeshed, separated relation about a center axis and connected together to form a cathode, an anchor member disposed along said center axis, and a plurality of anode wires attached to said anchor member and extending outwardly through the space between and parallel to said plate members.

6. A device for detecting gamma rays comprising a housing, a plurality of metallic plate members in the form of truncated cones positioned in said housing disposed in an intermeshed, separated relation about a center axis and connected together to form a cathode, an anchor member disposed along said center axis, a plurality of anode wires attached to said anchor member and extending outwardly through the spaces between and parallel to adjacent pairs of said plate members and an ionizable medium in said housing.

7. A device for detecting gamma rays comprising a housing, a plurality of metallic, frusto-conical plate members in said housing, said members being disposed in an intermeshed, separated relation about a center axis and connected together to form a cathode, an anchor member disposed so as to coincide with said center axis, a plurality of anode wires attached to said anchor member and extending outwardly through the spaces between and parallel to said plate members, and an ionizable medium in said housing.

DONALD G. C. HARE.

REFERENCES CITED

The following references are of record in the file of this patent:

UNITED STATES PATENTS

| Number | Name | Date |
|---|---|---|
| 2,374,197 | Hare | Apr. 24, 1945 |